Jan. 3, 1967   L. W. PARKER   3,296,475
DYNAMO-ELECTRIC MACHINES, AND ROTORS THEREFOR
Filed Sept. 15, 1965   5 Sheets-Sheet 1

INVENTOR

Louis W. Parker

BY Hall, Pallack & Vonde Sonde
ATTORNEYS

Jan. 3, 1967 L. W. PARKER 3,296,475
DYNAMO-ELECTRIC MACHINES, AND ROTORS THEREFOR
Filed Sept. 15, 1965 5 Sheets-Sheet 2
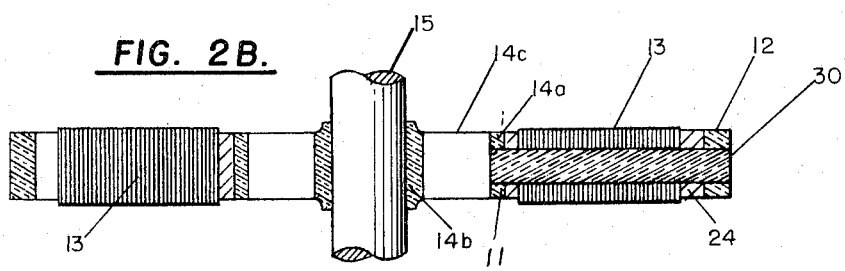
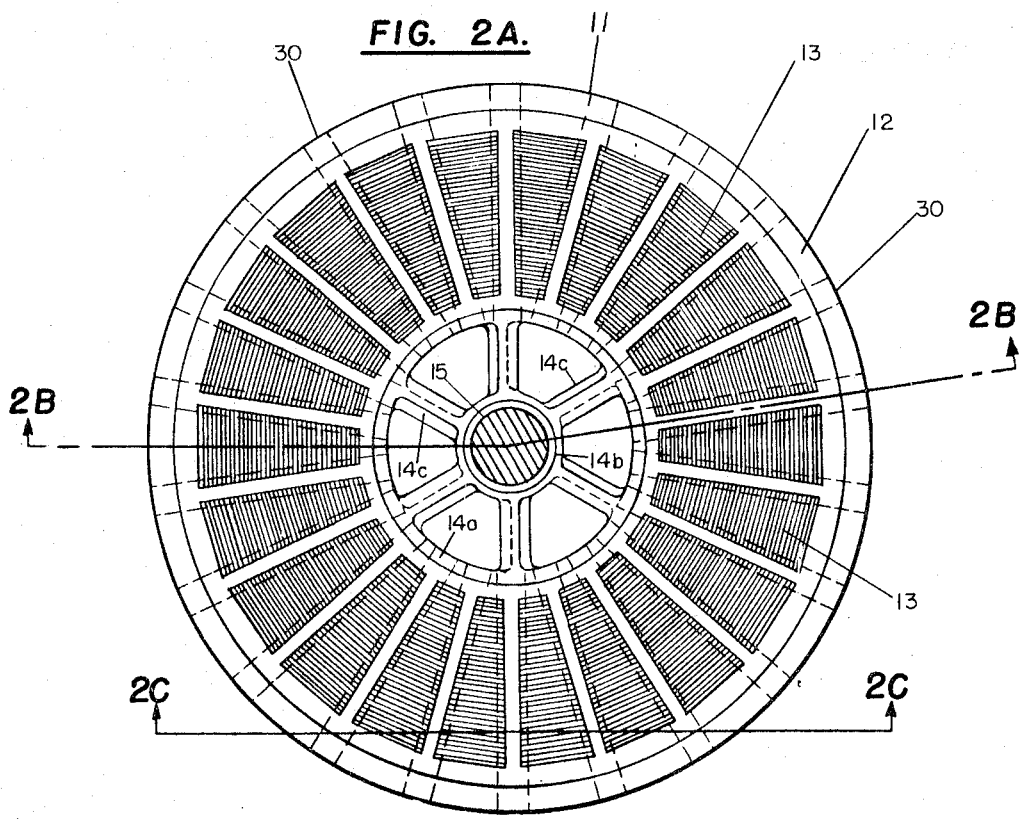
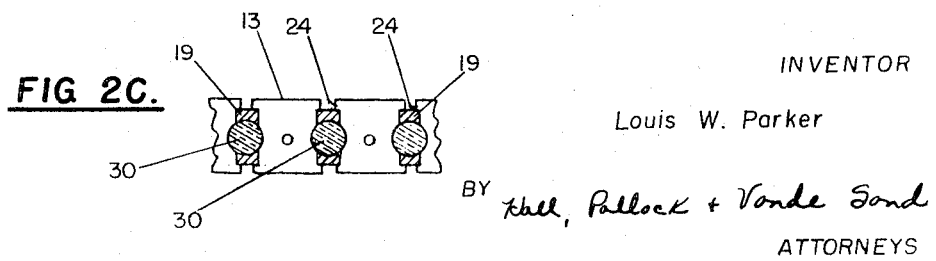
INVENTOR
Louis W. Parker
BY Hall, Pollock + Vande Sande
ATTORNEYS

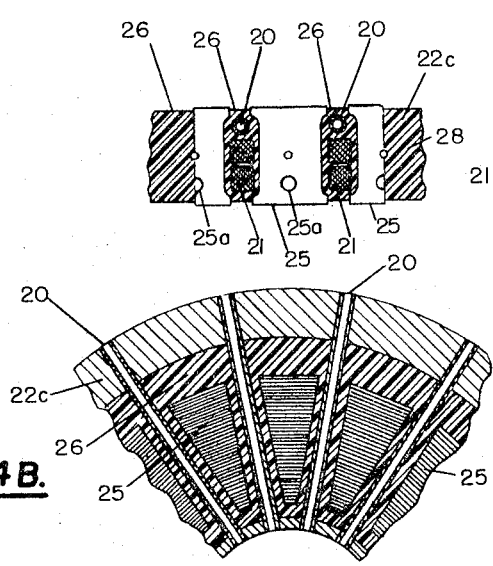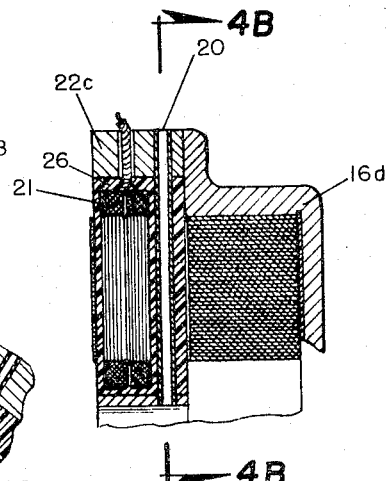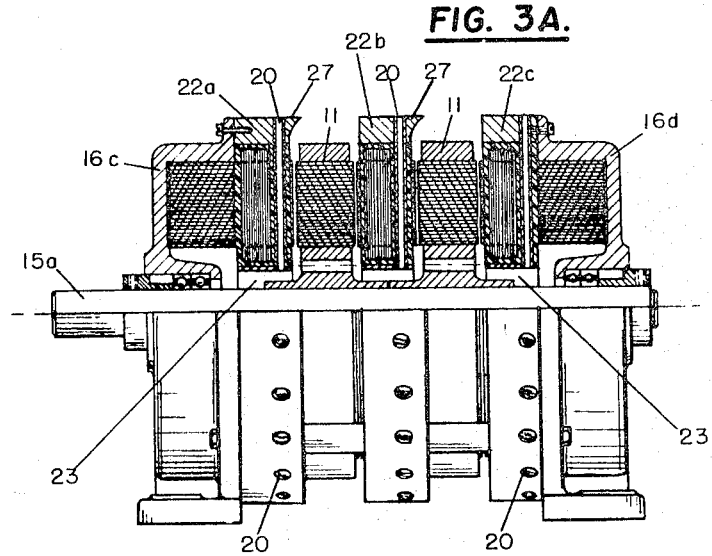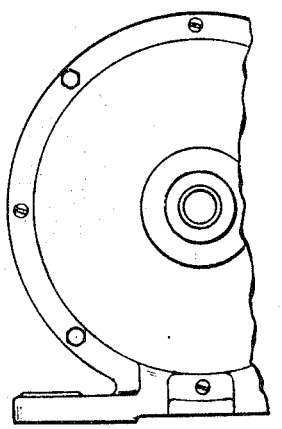
INVENTOR
Louis W. Parker

Jan. 3, 1967     L. W. PARKER     3,296,475
DYNAMO-ELECTRIC MACHINES, AND ROTORS THEREFOR
Filed Sept. 15, 1965     5 Sheets-Sheet 4

INVENTOR
Louis W. Parker

BY Wall, Pollack & Vonde Sonde
ATTORNEYS

Jan. 3, 1967  L. W. PARKER  3,296,475
DYNAMO-ELECTRIC MACHINES, AND ROTORS THEREFOR
Filed Sept. 15, 1965  5 Sheets-Sheet 5
FIG. 8.
FIG. 9.
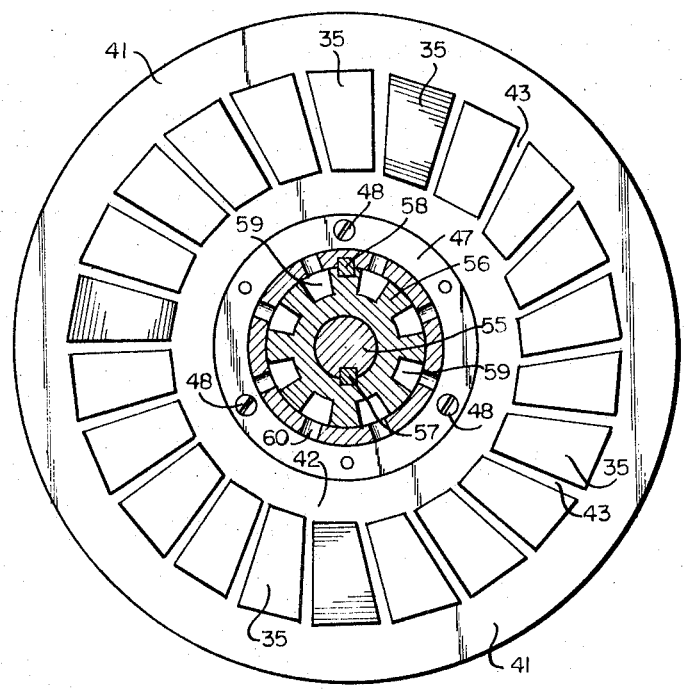
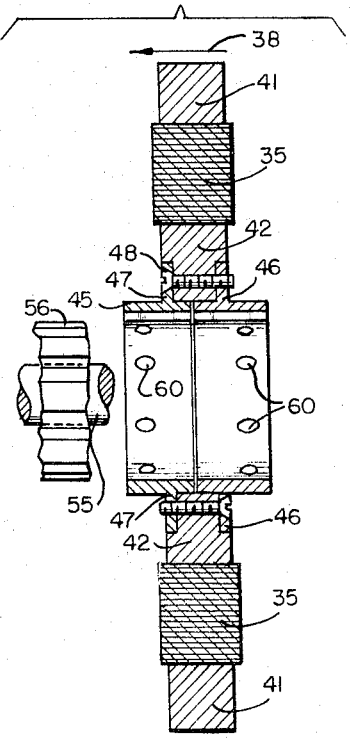
INVENTOR
Louis W. Parker
BY Hall, Pollack & Vande Sande
ATTORNEYS

United States Patent Office 3,296,475
Patented Jan. 3, 1967

3,296,475
DYNAMO-ELECTRIC MACHINES, AND
ROTORS THEREFOR
Louis W. Parker, 200 Harvard Ave.,
Stamford, Conn. 06902
Filed Sept. 15, 1965, Ser. No. 487,548
8 Claims. (Cl. 310—268)

The instant application is a continuation-in-part of my prior copending application Serial No. 339,642, filed January 23, 1964, Patent No. 3,277,323, for "Axial Airgap Machines and Improved Cooling Systems Therefor."

The present invention relates to dynamo-electric machines, and more particularly to electric motors and generators of the axial airgap types; and is especially concerned with machines of this general type arranged to be efficiently cooled by forced air circulation. The present invention is further concerned with improved rotors, and methods of fabricating such rotors, for use in induction motors of various types, including the machines to be described hereinafter.

In my prior U.S. Patent No. 2,479,589, I have described the principle of axial airgap motors and generators, as well as a simple way to construct such machines. In my subsequent Patent No. 2,734,140 for "Axial Airgap Motors and Generators" certain improvements in the details of such construction were also described. Inasmuch as the functional principles of axial airgap motors and generators are in themselves well known, and are set forth in my prior patents, a description of these fundamentals will not be given here; and my said prior patents are incorporated herein by reference for a discussion of the operation of the machines.

As a practical matter, an axial airgap motor or generator, e.g., of the type described in my said prior Patent No. 2,734,140, is from one-half to one-fifth the size of conventional machines of the same power and speed. Such axial airgap machines also exhibit smaller power losses than conventional machines of the same power and speed, e.g., only about sixty percent of the losses. However, due to the much smaller size of the machine, the heat to be dissipated can be considerably more per pound of machine in the axial airgap case than it is in the case of conventional machines, notwithstanding the power loss reduction mentioned. For this reason, proper operation of such axial airgap machines require very effective cooling and ventilating systems. An additional problem is created by the fact that, when one or more stators are employed inside the motor, only the outer edge of each stator is exposed to the outside. This represents a comparatively small surface for cooling.

In the arrangement of my prior Patent No. 2,734,140, the machine there described solved the cooling and ventilating problem by using a hollow central shaft. More particularly, the machine comprised a plurality of stator sections having a plurality of rotor sections interleaved therebetween, each of which said rotor sections was provided with a hollow hub. A common hollow sleeve also was provided, passing through said hubs, with said sleeve being open at both its ends and adapted to pass cooling air currents therethrough in a direction generally parallel to the machine axis of rotation. The hubs and sleeve were, moreover, each provided with apertures in registration with one another to permit air currents to emerge in substantially radial directions. When the motor rotated, the natural blower action of the rotating motor operated to draw air into the opposing open ends of the central shaft, comprising the aforementioned hubs and sleeve, with the air then being expelled through the aforementioned apertures in general radial directions past portions of the rotor and stator (as well as the laminations, conductors, and coils used therein) thereby cooling the machine.

While this arrangement of my prior Patent No. 2,734,140, effects sufficient cooling and ventilation of the machine, it has the disadvantage that at least one end, and preferably both ends, of the central shaft must be kept open to permit air to enter. The hollow shaft thus provided imposed a number of limitations upon the ways in which the machine could be used. For example, power had to be taken off the shaft by means of a pulley or gear arrangement; and it was usually inconvenient to direct-couple the machine to some other shaft as might be desired in various environments. In accordance with one aspect of the present invention, as will appear hereinafter, limitations of this type may be avoided and, as will also appear, more efficient cooling can actually be effected in an arrangement adapted for more convenient physical utilization.

The machine described in my prior Patent No. 2,734,140, is also characterized by a rotor taking the form of a wheel having spokes between which grain oriented laminated material is placed. Fabrication of the rotor requires the assembly of a number of structural parts, forming the spokes, rims, etc., of the rotor. In accordance with another aspect of the present invention, a rotor capable of use in a machine such as is described in my prior Patent No. 2,734,140, or in other forms of induction motors including those to be described hereinafter, may be fabricated more easily and economically by a casting technique; and results in a rotor which actually exhibits improved characteristics.

It is accordingly an object of the present invention to provide an axial airgap machine incorporating a highly efficient cooling and ventilating system.

Another object of the present invention resides in the provision of an axial airgap rotor and stator arrangement having a novel system of apertures and passageways for introducing and distributing air past heated portions of the machine, thereby to effect cooling and ventilation thereof.

A still further object of the present invention resides in the provision of an improved axial airgap motor and generator which has a rotating shaft adapted to be more easily coupled to another shaft than has been possible heretofore, without in any way impairing the machine ventilation.

Still another object of the present invention resides in the provision of an improved axial airgap machine having a rotor of lower resistance than has been provided heretofore, thereby reducing power losses.

A further object of the present invention resides in the provision of a new rotor for dynamo-electric machines, e.g., induction motors, taking the form of plural stacks of grain oriented steel laminations disposed within a cast aluminum matrix forming short circuited turns around said stacks and also functioning to hold the stacks physically. In this respect, it is still another object of the present invention to provide a rotor of the type described, wherein the cast aluminum matrix is associated with and supported by a steel hub.

Another object of the present invention resides in the provision of improved and more efficient induction motor rotors, as well as in the provision of novel techniques for fabricating such rotors more easily and less expensively than has been the case heretofore.

In providing for the foregoing objects and advantages, the present invention contemplates the provision of an axial airgap machine comprising stator and rotor structures generally similar to the types described in my prior Patent No. 2,734,140. In accordance with the present invention, however, the rotor sections, rather than being formed by assembly of plural parts comprising the spokes and rims of the rotor, are preferably formed by casting an aluminum matrix about an array of lamination stacks, as will be described. The resultant rotor may be so formed that it may be mounted upon a solid shaft as will be described; or, in the alternative, it may be mounted on a hollow shaft of the type used in my prior Patent No. 2,734,140.

When a solid shaft is used, the mounting means employed for positioning the rotor sections on the shaft may take various forms, but in general are such that central air flow passageways or chambers are provided in surrounding relation to said solid shaft. Air entrance openings are also provided in communication with these central chambers, either in the end bells of the machine whereby air may enter in generally axial directions, or as separate passageways provided adjacent portions of the rotor and stator assemblies and adapted to permit air to enter in generally radial directions. In either event, a relatively large volume of air is drawn into the central chambers surrounding the central solid shaft, whereafter said air is expelled in generally radial directions through gaps and slots provided in both the rotors and stators.

The new rotor structure, which comprises a particular feature of the present invention, takes the form of a plurality of wedge-shaped stacks of grain oriented steel laminations spaced from one another and arranged in a circular array. The stacks of laminations are held in position relative to one another by means of a cast aluminum matrix, i.e., the rotor is fabricated by placing the lamination stacks in a form, whereafter molten aluminum is poured into said form to fill the spaces around and between said stacks, thereby to compose short circuited turns around the stacks and to hold said stacks physically in place. Since aluminum has a lower melting point than the temperature which would destroy the unusual magnetic properties of the grain oriented steel laminations, and since aluminum is a good electrical conductor, the casting technique described immediately produces (upon cooling of the aluminum matrix) a rotor configuration having desired electrical characteristics. A steel hub is preferably provided to strengthen the central portion of the rotor, since the aluminum matrix material may be too weak for direct support on the rotating shaft of the machine. The steel hub is assembled in two pieces, to hold firmly the opposing sides of the aluminum rotor.

In one form of my invention to be described hereinafter, the rotor supporting structure includes a plurality of inclined or pitched spokes operating in the manner of propeller blades to effect larger volumes of air flow than would be achieved by the blower action of the rotor itself. In accordance with another feature of the invention to be described, particularly where air both enters and leaves in radial directions, means may be provided for effectively isolating emerging heated air from the cooling air inlets. Still further features will become apparent to those skilled in the art, all of which in combination with one another provide novel axial airgap machines of greater efficiency and utilization than has been the case heretofore.

The foregoing objects, advantages, construction and operation of the present invention will become more readily apparent from the following description and accompanying drawings, in which:

FIGURE 2A is an end view of a rotor section, of the machine shown in FIGURE 1A;

FIGURE 2B is a cross-sectional view of said rotor section, taken on line 2B—2B of FIGURE 2A;

FIGURE 2C is a further detailed view of the rotor shown in FIGURE 2A, taken on line 2C—2C of FIGURE 2A;

FIGURE 3A is a side view in partial section of a modified form of the present invention;

FIGURE 3B is an end view of the machine of FIGURE 3A;

FIGURE 4A is a detailed view of a portion of the machine shown in FIGURE 3A;

FIGURE 4B is a cross-sectional view taken on line 4B—4B of FIGURE 4A;

FIGURE 4C is a top detailed view of a portion of the machine shown in FIGURES 4A and 4B;

Figure 5:
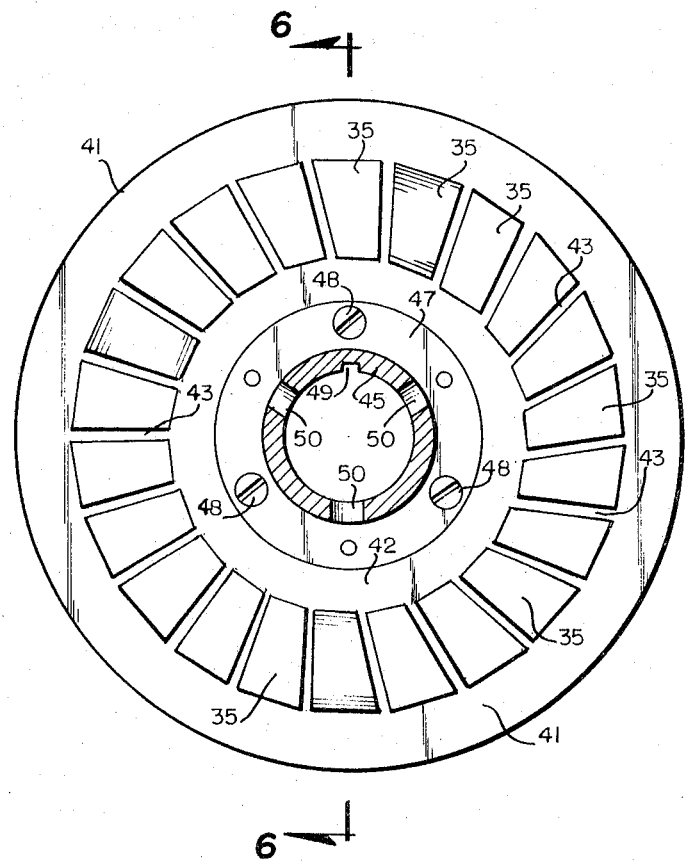
FIGURE 5 is an end view of a modified form of rotor constructed in accordance with the present invention.
Figure 7A:
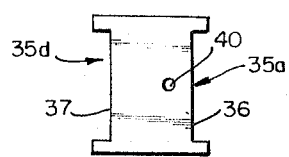
Figure 7B:
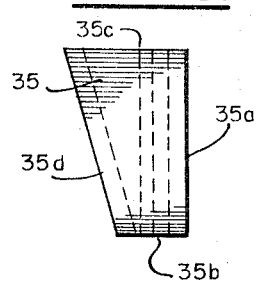
Figure 7C:
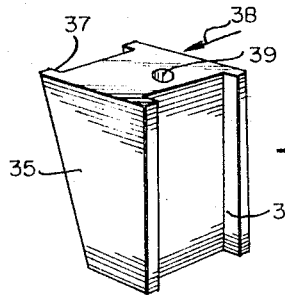

FIGURES 7A, 7B, and 7C are top, side, and isometric views respectively of a typical lamination stack used in the rotor of FIGURE 5, or of FIGURE 8;

FIGURE 8 is a view similar to FIGURE 5, showing another embodiment of a rotor constructed in accordance with the present invention; and FIGURE 9 is a view taken on line 9—9 of FIGURE 8.

Figure 1A:
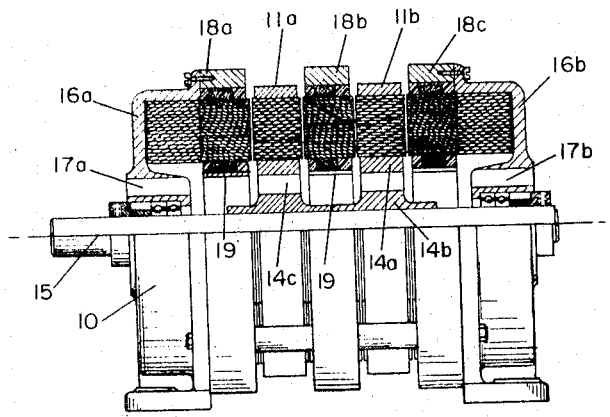
FIGURE 1A is a side view in partial section of an axial airgap machine constructed in accordance with one embodiment of the present invention.
Figure 1B:
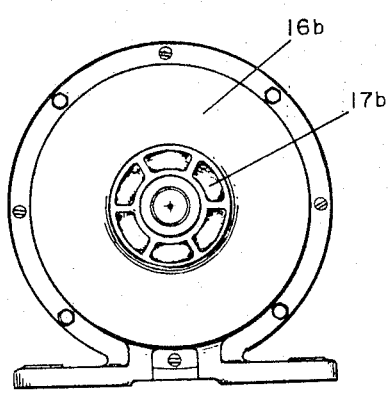
FIGURE 1B is an end view of the machine shown in FIGURE 1A.

Referring now to FIGURES 1A, 1B, and 2A through 2C inclusive, like numerals of which refer to like parts throughout, it will be seen that in accordance with one form of the present invention, an axial airgap machine 10 may comprise one or more rotor sections 11 (see FIGURES 2A and 2B) mounted for rotation in interleaved relation to a plurality of stator sections. In the view shown in FIGURE 1A, two such rotor sections 11a and 11b are provided, in association with stator sections 18a, 18b, and 18c. The rotor and stator sections shown in FIGURES 1A, 2A and 2B are constructed to provide air chambers adjacent the center of the machine, adapted to cooperate with air entry orifices at one or both ends of the machine, to permit cooling air to enter and circulate through the machine during normal machine operation.

Each of the rotor sections of the machine, generally shown at 11 in FIGURES 2A and 2B, comprises an outer rim 12 constructed of an appropriate non-magnetic material, e.g., copper, cast aluminum, or other non-magnetic metallic material, or of plastic in case coil windings are used, disposed in surrounding relation to a plurality of wedge-shaped lamination stacks 13. The lamination stacks 13 are, in accordance with one of the features of the present invention, so constructed as to reduce the resistance of the rotor sections, and also to simplify the rotor manufacture. More particularly, the lamination stacks 13 are cut from silicon steel tightly wound as a ribbon around a rectangular form, with each turn of the winding being cemented to the rest of the stack in the course of stack preparation so that after an appropriate curing or drying process, the stack presents a solid core. Care is taken to have the silicon steel ribbon cut so that the dimension which is parallel to magnetic lines of force is in the direction that the ribbon was rolled in its manufacture, since silicon steel has superior magnetic qualities in this direction. After the stacks of laminations 13 have been cut from said wound ribbon, their faces are so finished that the face of the final rotor is normal to the original direction in which the silicon steel ribbon was rolled. These particular characteristics of the ribbon used in lamination stacks 13 do not per se constitute the present invention, and have already been described in my prior Patent No. 2,734,140.

In accordance with the improved form of rotor contemplated by the present invention, the several lamination stacks 13, after being cut and finished, have grooves or radial slots 24 milled into both sides thereof to facilitate (as will appear) air flow through the machine in generally radial directions, and also to accommodate copper conductors 19 (see FIGURE 2C). The said conductors 19 and laminations 13 are then set in an appropriate mold, whereafter liquid metal or plastic is poured around the conductors 19 and laminations 13 to complete the fabrication of a rotor of the type shown in FIGURES 2A and 2B. During this pouring operation, care is taken not to raise the temperature of the lamination stacks 13 so high as to alter desired magnetic properties of silicon steel in laminations 13; and, for this reason, if liquid aluminum or the like is used to cast the main supporting matrix of the rotor laminations and conductors, the lamination stacks are preferably cooled during the casting process. Such cooling is not mandatory when molten aluminum is used, however, since aluminum has a lower melting point than the temperature which would destroy the unusual magnetic properties of the oriented material.

In place of milled grooves such as 24, the rotor can, after being constructed, be appropriately drilled in radial directions to provide slots of circular cross-section adapted to accommodate the copper conductors; provided, of course, that the conductors employed are intended to be of circular cross-section. However, if the lamination stacks are pre-grooved in the manner described, copper conductors of any cross-sectional shape may be used, and the grooves can also actually have the copper conductors therein during the casting process, so as to simplify the overall fabrication of the construction.

As a result of the fabrication technique described, the rotor section 11 comprises the aforementioned plural lamination stacks 13, having copper conductors 19 and radially extending rods of conductive or structurally supporting material 30 disposed between the several stacks 13 (see FIGURE 2C), with said conductors and rods being in firm engagement with the outer rim 12 as well as with the opposing sides of the several lamination stacks 13. The inner ends of this assemblage also firmly engage an inner supporting structure. This inner supporting structure, comprising parts 14a, 14b, and 14c, to be described, may be formed of a non-magnetic material, such as copper; but due to low mechanical strength of copper, it may, in the alternative, comprise beryllium copper or some other physically stronger material or assemblage such as a copper ring combined with a steel hub. In any event, the inner supporting structure comprises a pair of non-magnetic spaced concentric sleeves 14a and 14b of different respective diameters, having generally radial spokes 14c extending therebetween. The inner sleeve 14b, which may include an innermost steel hub, is adapted to firmly engage, e.g., by an appropriate key structure, a central shaft 15, which shaft, in distinction to that used in the construction of my prior patent, is now solid thereby facilitating its coupling to other shafts. This overall rotor-stator-shaft assemblage is positioned between a pair of end bells 16a and 16b, carrying stator sections 18a and 18c as well as supporting members for stator section 18b and bearings for shaft 15; and said end bells 16a and 16b are further provided with air entry openings 17a and 17b, respectively, as illustrated.

The above described rotor construction is very efficient electrically, but is relatively expensive. A less expensive construction can be fabricated by pouring aluminum around the lamination blocks in a mold, leaving out the copper. Such construction depends on the conductivity of the aluminum to carry the rotor current. Due to the high permeability of oriented silicon steel, this rotor current need not be as high as would be necessary with ordinary silicon steels. The cast aluminum matrix also physically holds the lamination blocks or stacks in position relative to one another, thereby eliminating the need for special supporting spokes, and separate rims, as was the case in my prior Patent No. 2,734,140. An innermost steel hub should be provided, as mentioned above, however, to give the structure adequate strength for rotation with shaft 15.

In one form of rotor constructed in accordance with the present invention, spokes 14c are provided; and the several spokes 14c are, as best shown in FIGURE 2A, tilted, inclined, or pitched, in the manner of propeller blades so that, upon rotation of the rotor sections 11, the said spokes 14c operate to draw air into the machine 10 from its opposing ends via the end bell apertures 17a and 17b. In a motor having multiple rotors, such as 11a and 11b of FIGURE 1A, the blades or spokes of the several rotors should be pitched in opposite directions so as to draw air toward the middle of the machine. It is, of course, also possible to provide machines of the type described with more than two rotor sections; and in such an event, half of the rotor sections should be pitched in one direction, with the pitch of the remaining half being in the opposite direction, in order to provide the same result of drawing air into the machine and toward its middle area.

The various stator sections 18a, 18b, and 18c are, as best illustrated in FIGURE 1A, so constructed as to provide further recesses or chambers 19 in surrounding relation to the central shaft 15 of the machine, whereby the chambers 19 cooperating with the spaces between the several rotor spokes or blades 14c, and further cooperating with the end bell openings 17a and 17b, provide a central cooling chamber or conduit functioning, during operation of the machine, to draw cooling and ventilating air into the machine in surrounding relationship to the central shaft.

As is also illustrated in FIGURE 1A, and as is described in my prior Patent No. 2,734,140, gaps and radial slots are present between the several rotor and stator sections through which cooling and ventilating air may flow. The bladed spokes 14c are intentionally formed so as to exhibit less than maximum efficiency; and, accordingly, air drawn into the machine via the opposing end bell apertures 17a and 17b is not propelled entirely through the spokes 14c. Some of the air so drawn into the machine, passes by centrifugal action through the air gaps and radial slots between the rotor and stator sections to the periphery of the rotors and then leaves the machine.

The provision of tilted spokes acting in the manner of blades, effects an increased volume of air flow. However, as is also described in my prior Patent No. 2,734,140, rotation of the rotor tends to effect an air flow due to natural blower action; and the provision of bladed spokes can accordingly be dispensed with in some machines. In such case, radial spokes 14c are still provided, however, and the various cooling chambers and regions described are still present due to the chambers 19 provided by the stator section as well as due to the spaces between the spokes.

An alternative cooling structure is shown in FIGURES 3A, 3B, and 4A through 4C, inclusive. In the arrangement previously described, air enters the machine in a generally axial direction, in surrounding relation to the central shaft, and is then expelled in a generally radial direction through gaps and radial slots between the rotor and stator sections. In the alternative form shown in FIGURES 3A, et seq., solid end bells are provided, and air both enters and leaves the machine in generally radial directions. The machine again comprises end bells 16c and 16d supporting, in this case, modified stator structures 22a, 22b, and 22c, all in surrounding relation to the central shaft 15a of the machine. A portion of one of the stators 22c is shown in greater detail in FIGURES 4A, 4B, and 4C; and, as there shown, the stator comprises a plurality of lamination stacks 25 having coil windings 21 thereon encased within a supporting plastic matrix 26 in the manner, and by the technique, described in my prior Patent No. 2,734,140. The plastic matrix material 26 accommodates elongated generally radially extending tubes 20 adapted to pass air from the outermost periphery of the stator sections to central chambers 23 provided in surrounding relationship to shaft 15a.

In the illustrated forms of the invention, only one tube 20 has been shown between each adjacent pair of the several lamination stacks 25; but it will be understood that any larger number of such tubings may be used between pairs of lamination stacks. It will, moreover, be appreciated that, if desired, further air may be caused to enter via the machine stator sections by provision of air entry tubes drilled or otherwise formed into the stator laminations 25 themselves; and such lamination tubes have been depicted at 25a (see FIGURE 4C).

The rotor sections employed with the machine of FIGURE 3A can be constructed in a manner generally similar to that already described in reference to FIGURES 1A, 2A and 2B; and, accordingly, the rotor sections in FIGURE 3A have again been designated as 11. In operation, these rotors act in the manner of blowers to draw air into the machine in generally radial directions via tubings 20 and/or 25a. The air so radially entering the machine then passes to spaces 23 in surrounding relation to the central shaft 15a, whereafter the air is expelled, again in a generally radial direction, via the gaps and radial slots between the rotor and stator sections. In order to minimize the possibility of the emerging heated air being redrawn into the machine via the air entry openings 20 and/or 25, inclined deflectors 27 are preferably provided on the stator sections, e.g., in the manner illustrated on stator sections 22a and 22b; and these deflectors projecting from the stator sections, tend to direct emerging heated air away from the air entry openings in that same stator section.

It will be noted that, in the rotor arrangement described in reference to FIGURES 2A, 2B, and 2C, the radial slots 24 provided between the several lamination stacks 13 are not completely filled by copper conductor and supporting material; and as is best illustrated in FIGURE 2C, these slots actually form grooved depressions between the several lamination stacks in the rotor sections thereby increasing the cross-sectional gap area between adjacent rotor and stator sections. As a result, a greater volume of air can pass between the rotor and stator sections than has been the case heretofore, whereby greater cooling can be effected. This same consideration applies in the arrangement of FIGURES 3A et seq., not only with respect to the rotors, but with respect to the stator sections as well. Thus, as is illustrated in FIGURE 4C, the lamination stacks 25 project slightly over the plastic filler material 26 to form a further grooved channel through which air may pass from the center of the machine.

Figure 6:
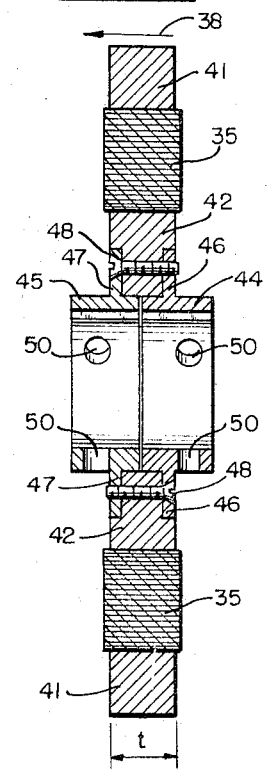
FIGURE 6 is a cross-sectional view of my improved rotor, taken on line 6—6 of FIGURE 5.

The casting technique described previously can also be used to good advantage in the fabrication of a rotor arranged to be supported for rotation in a manner similar to that described in my prior Patent No. 2,734,140. One such rotor is illustrated in FIGURES 5 through 7, inclusive. More particularly, the rotor may comprise a plurality of stacks of laminations 35 formed by a technique similar to that described previously for the lamination stacks 13. The stacked laminations 35, for the form of rotor shown in FIGURES 5 through 7, are illustrated in detail in FIGURES 7A, 7B, and 7C. More particularly, each lamination stack can be formed to exhibit a side surface 35a (see FIGURE 7B), a bottom surface 35b disposed at substantially right angles to side 35a, an upper surface 35c also disposed at substantially right angles to side 35a, and an inclined side 35d disposed at an angle of substantially 16° to side 35a. The sides 35a and 35d are slotted as at 36 and 37 to provide key ways adapted to receive the molten metal matrix material, to hold the stacks firmly in place within the rotor.

The various laminations forming the stacks 35 are formed of grained oriented material, as was the case for the lamination stacks 13 described earlier; and the direction of orientation is along the direction of arrow 38 (see FIGURES 6 and 7C), i.e., in a direction parallel to the axis of rotation of the rotor. Moreover, to facilitate handling of the laminations prior to their assembly in the rotor, the several laminations in an individual stack are preferably drilled as at 39 (see FIGURE 7C) to receive a rivet 40 (see FIGURE 7A) and thereafter riveted together.

The various lamination stacks 35 are placed in a form, in the circular array shown in FIGURE 5, with the wider ends of said stacks being positioned adjacent the outer periphery of said array, and with the narrower ends of said stacks being disposed adjacent the axial center of said array. Molten metal, preferably aluminum, is then poured into the form to fill the spaces between and around the arrayed lamination stacks. This poured metal flows between and around the various stacks so as to form an outer cast metallic portion 41, an inner cast metallic portion 42, and intervening cast metallic spokes 43 all integral with one another. Due to the contraction of the poured metal as it cools, and due to the slotted stack portions 36 and 37 which receive those parts of the poured metal forming spokes 43, the stacks of laminations are held very tightly in place by the cast matrix itself. This makes for considerable ease in the manufacture of the rotor since the stacks may be left unsupported except for the poured metal.

While various molten metals may be used in the casting technique described above, aluminum is preferred. Aluminum has a lower melting point than the temperature which would destroy the desired magnetic properties of the grain oriented material; and, therefore, the rotor may be formed by the casting technique described without impairing the electrical characteristics of the finished rotor. Moreover, since aluminum is a good electrical conductor, and since the aluminum matrix comprising portions 41, 42, and 43 completely surrounds each of the lamination stacks 35, the poured aluminum acts not only to hold the stacks in place, but also acts to provide short-circuited turns around the stacks without the need of separate conductive inserts.

Since a hub formed of aluminum alone would be too weak physically for sustained high speed rotation of the rotor, the central portion of the rotor is preferably provided with a tool steel hub pressing into the aluminum supporting matrix from both sides of the rotor. Such a hub can take the form of aligned steel hub sections 44 and 45, spaced slightly from one another adjacent the central interior of the rotor. Hub sections 44, 45 form an axially extending sleeve provided with radial flanges 46 and 47 recessed into the exterior sides of the supporting matrix. Screw members 48 pass through the cast matrix between and in engagement with the radial flanges 46 and 47 to forcibly draw the hub sections 44 and 45 in firm pressing relation to the opposite sides of the aluminum matrix adjacent the central rim portion 42 of said matrix. The sleeve portion of central hub 44–45 may be provided with a key way 49 to facilitate mounting of the rotor on the central shaft. Moreover, the central hub 44–45 may be provided with a plurality of ventilating holes 50 to permit air to enter and be expelled in radial directions; and these ventilating holes do not weaken the hub structure excessively due to its steel construction.

As will be appreciated from the rotor configuration described, both sides of the rotor are operative to generate torque; and, due to the superior magnetic properties of oriented steel, more torque is generated than is the case with rotors suggested heretofore.

The rotor structure described may be readily made in various sizes for use in machines having various different ratings. In a typical case, a rotor of the type shown in FIGURES 5 through 7, fabricated for use in a 7½ H.P. induction motor, has an outside diameter of approximately 8.75 inches. The sides 35a of individual lamination stacks 35 have a length of substantially 1 5/16 inches drawing said flanges into firm engagement with said opposing sides of said matrix.

7. A rotor for a dynamo-electric machine comprising a plurality of spaced wedge-shaped stacks of grain oriented steel laminations arranged in a circular array, said stacks having the laminations thereof grain oriented in a direction parallel to the axis of rotation of said rotor, said wedge-shaped stacks having their wider ends positioned adjacent the outer periphery of said circular array and their narrower ends positioned adjacent the axial center of said array, supporting means for said array consisting entirely of a cast aluminum matrix forming radially extending cast aluminum supporting members between the sides of adjacent ones of said wedge-shaped stacks and also forming inner and outer cast aluminum rims surrounding said stacks adjacent the inner and outer peripheries of said array, the sides of each of said wedge-shaped stacks having indented portions keying said stacks to said radially extending cast aluminum supporting members, and a steel hub adjacent to the inner aluminum rim of said array supporting said stacks and said cast aluminum matrix for rotation, said hub including a pair of integral steel annuli extending transverse to the axis of rotation of said rotor and located respectively adjacent opposing sides of said matrix, said annuli overlying and being recessed into said opposing sides of said matrix.

8. A rotor for an induction motor comprising a plurality of spaced wedge-shaped stacks of steel laminations arranged in a circular array with the wider ends of said wedge-shaped stacks positioned adjacent the outer periphery of said circular array and their narrower ends positioned adjacent the axial center of said array, supporting means for said array consisting entirely of a cast non-magnetic metal matrix forming radially extending cast metallic supporting members between the sides of adjacent ones of said wedge-shaped stacks and also forming a cast metallic rim surrounding said stacks adjacent the outer periphery of said array, the sides of said wedge-shaped stacks having means keying said stacks to said radially extending cast metallic members, each of said wedge shaped stacks having a dimension in a direction parallel to the axis of rotation of said rotor greater than the dimension of said radially extending supporting members in said direction, whereby said stacks protrude outwardly from the opposing sides of said matrix to form radially extending grooves between said stacks and along said radially extending supporting members on both sides of said matrix adapted to permit radial flow of cooling air past said stacks during rotation of said rotor, and hub means attached to said cast metal matrix adjacent to the inner periphery of said circular array for supporting said stacks and said cast metal matrix for rotation.

References Cited by the Examiner
UNITED STATES PATENTS 2,550,571  4/1951  Litman _____ 310—211

MILTON O. HIRSHFIELD, *Primary Examiner.*

L. L. SMITH, *Assistant Examiner.* and a width of substantially 0.984 inch, with the slotted portion 36 of side 35a (as well as portion 37 of side 35d) having an interior width of substantially 0.812 inch. The width of side 35b (as shown in FIGURE 7B) is substantially 0.51 inch along side 35b; and the width of side 35c (as shown in FIGURE 7B) is substantially 0.885 inch. The lamination stacks 35 are so positioned in a cast aluminum matrix as to provide a circular array (as shown in FIGURE 5) having an outside diameter of substantially 7⅛ inches and an inside diameter of substantially 4⁷⁄₁₆ inches. The hub flanges 46 and 47 have an outside diameter of substantially 3½ inches; and the sleeve portion of the hub preferably has an inside diameter of 1.75 inches and an outside diameter of substantially 2¼ inches. The aluminum matrix, in this particular embodiment of the invention, has a thickness $t$ (see FIGURE 6) of substantially 0.843 inch throughout the main body of the rotor, and preferably exhibits a reduced dimension of substantially 0.593 inch between the inner facing sides of the radial hub flanges 46 and 47 so that the outer sides of said hub flanges are substantially flush with the outer sides of the aluminum matrix as illustrated in FIGURE 6.

An alternative rotor structure fabricated by the techniques described above is shown in FIGURES 8 and 9. For the most part, this rotor structure incorporates the same parts which characterize the rotor of FIGURES 5 and 6; and accordingly like numerals have been used for like parts. The particular rotor arrangement shown in FIGURES 8 and 9, however, employs a solid shaft 55; and the sleeve portion of the hub sections 44–45 is very large in diameter in comparison to the outside diameter of shaft 55. A spider 56 comprising a plurality of spaced spokes is, therefore, inserted between the sleeve portion 44–45 and the shaft 55. This spider 56 is keyed to the shaft at 57 and is also keyed to the hub at 58. The resulting structure is accordingly analogous to that previously described in reference to FIGURE 2. The various spokes of the spider 56 are spaced from one another to provide air passageways 59 in register with the several ventilating holes 60 provided in the hub. Cooling air can accordingly pass between the several spokes of spider 56, and thence via the ventilating holes 60, to be expelled radially through the air gaps and radial slots between the rotor and stator sections.

While I have thus described preferred embodiments of the present invention, many variations will be suggested to those skilled in the art. The foregoing description is, accordingly, meant to be illustrative only and all such variations and modifications as are in accord with the principles described are meant to fall within the scope of the appended claims.

Having thus described my invention, I claim:

1. In a dynamo-electric machine of the axial airgap type, rotor means comprising a plurality of wedge-shaped stacks of grain oriented steel laminations arranged in a circular array, said stacks having their wider ends adjacent the outer periphery of said circular array and their narrower ends adjacent the axial center of said array, supporting means for said array comprising a cast aluminum matrix forming radially extending aluminum supporting members between said wedge-shaped stacks and an aluminum rim surrounding said stacks adjacent the outer periphery of said array, said stacks protruding outwardly from said matrix to define radial grooves between said stacks adapted to permit flow of cooling air between said stacks during rotation of said rotor means, and means adjacent the narrower ends of the stacks in said array supporting said stacks and said cast aluminum matrix for rotation, said last-named means comprising a hub having a pair of parallel flanges overlying portions of said cast matrix and located respectively on opposing sides of said matrix adjacent the axis of rotation of said rotor means, said flanges being recessed into said cast aluminum matrix so that the outer sides of said flanges are substantially flush with the outer sides of said radially extending supporting members.

2. In a dynamo-electric machine, a plurality of rotor sections each of which comprises a plurality of wedge-shaped lamination stacks positioned in a circular array and supported in said array by a cast aluminum matrix disposed around and between said arrayed stacks, each of said rotor sections having a central support comprising a steel hub, said central support further including means defining air passages adjacent said hub, means mounting said hubs for rotation in said machine, stator means disposed adjacent said rotor sections, and air entry passage means communicating the exterior of said machine with said air passages, said rotor sections and stator means being mounted in axially mutually spaced relation to one another to provide a plurality of substantially radially extending gaps therebetween for the egress of air from the interior of said machine.

3. In a dynamo-electric machine, a rotatable central shaft, ring-shaped rotor means comprising a plurality of wedge-shaped lamination stacks supported in a cast aluminum matrix, said rotor means having a central support comprising a steel hub including a sleeve surrounding said shaft in spaced relation thereto, said hub including spaced annular flanges attached to said sleeve and overlying opposing sides of said cast aluminum matrix in firm contact with said matrix, spider means comprising a plurality of spaced spokes extending from the inner surface of said sleeve to said shaft for providing air passages through the space between said sleeve portion and said shaft while simultaneously effecting rotation of said rotor means with said shaft, ring-shaped stator means disposed adjacent to said rotor means, the inner portion of said stator means being spaced from said shaft to define an open air passage through said stator means and around said shaft, and means providing an air entry passage communicating the exterior of said machine with said rotor and stator air passages for effecting a flow of cooling air through said machine upon rotation of said shaft and rotor means.

4. The structure of claim 3 wherein said hub comprises two sleeve portions disposed in axially aligned relation to one another to form said sleeve, each of said sleeve portions having one of said annular flanges thereon, and fastening means extending between said flanges through said aluminum matrix for drawing said flanges toward one another into firm contact with opposing sides of said matrix.

5. A rotor for a dynamo-electric machine comprising a plurality of stacks of grain oriented steel laminations arranged in a circular array about an axis of rotation, said laminations being grain oriented in a direction substantially parallel to the axis of rotation of said rotor, supporting means for said array consisting of a cast aluminum matrix forming cast radially extending metallic supporting members between said wedge-shaped stacks and also forming inner and outer cast metallic rims integral with said radial members and surrounding said stacks adjacent the inner and outer peripheries of said array, whereby said cast matrix supports said stacks in said array and also forms short circuited turns of cast aluminum around each of said stacks, and hub means adjacent the center of said array supporting said stacks and said cast aluminum matrix for rotation about said axis, said hub means comprising a steel sleeve passing through said cast aluminum matrix along said axis of rotation, and said hub means further comprising circular flanges attached to said sleeve and extending transverse to said direction of rotation adjacent opposing sides of said cast aluminum matrix.

6. The rotor of claim 5 wherein said steel sleeve comprises a pair of spaced sleeve portions disposed in aligned relation to one another, each of said sleeve portions carrying one of said circular flanges, and fastening means passing through said matrix between said flanges for